United States Patent [19]
Nakamura et al.

[11] Patent Number: 6,015,309
[45] Date of Patent: Jan. 18, 2000

[54] PC CARD CONNECTOR

[75] Inventors: Hidehiro Nakamura; Kazuki Satou; Wataru Oguchi, all of Miyagi-ken, Japan

[73] Assignee: Alps Electric Co., Ltd., Japan

[21] Appl. No.: 09/038,614

[22] Filed: Mar. 11, 1998

[30] Foreign Application Priority Data

Mar. 12, 1997 [JP] Japan .................................. 9-057993

[51] Int. Cl.$^7$ ...................................................... H01R 13/62
[52] U.S. Cl. ........................................... 439/159; 439/160
[58] Field of Search .................................. 439/159, 160, 439/152–158

[56] References Cited

U.S. PATENT DOCUMENTS

| | | | |
|---|---|---|---|
| 5,368,493 | 11/1994 | O'Brien et al. | 439/160 |
| 5,451,168 | 9/1995 | Shuey | 439/157 |
| 5,683,258 | 11/1997 | Takano et al. | 439/159 |
| 5,921,792 | 7/1999 | Chen | 439/160 |

Primary Examiner—Paula Bradley
Assistant Examiner—Tho Dac Ta
Attorney, Agent, or Firm—Brinks Hofer Gilson & Lione

[57] ABSTRACT

In a PC card connector, first and second support shafts are mounted upright on a pin housing, and each provided with a pair of fall-preventive sections at the leading end thereof. A first turn arm is provided with a circular hole, a protrusion, a tongue, a concave section on the rim of the circular hole, and a pair of cutouts that cross the concave section, and the circular hole is fitted on the first support shaft through the cutouts so that the first turn arm can move pivotally. A second turn arm is formed similarly to the first turn arm, and a circular hole thereof is fitted on the second support shaft so that the second turn arm can move pivotally. A drive lever is provided with a circular hole, an engaging section, a coupling hole, a thin concave section formed on the rim of the circular hole, and a pair of cutouts that cross the concave section. The circular hole is fitted on the first support shaft through the cutouts so that the drive lever can move pivotally, and the drive lever and the first turn arm are prevented from falling off by the fall-preventive sections of the first support shaft. The tongues of the turn arms are engaged with the coupling hole of the drive lever, and the engaging section is engaged with a push-rod.

2 Claims, 5 Drawing Sheets

PC CARD CONNECTOR

BACKGROUND OF THE INVENTION

1. Field of the Invention

The present invention relates to a PC (Personal Computer) card connector to be provided in an apparatus that is used with a PC card loaded therein, and more particularly, to an improvement in an eject mechanism for disconnecting a PC card loaded in a connector from pin contacts.

2. Description of the Related Art

A PC card (memory card) for use in a notebook personal computer and the like is loaded into and unloaded from a PC card connector for its exclusive use. Since standardization of the shape of the PC card, and dimensions, arrangement and the like of pin contacts in the PC card connector has recently proceeded, it is expected that general versatility of products of the same type and demands therefor will be rapidly increased.

The PC card connector generally includes a pin header in which a plurality of pin contacts to be connected to socket contacts in a PC card are arranged in a pin housing, a frame for guiding the PC card during loading and unloading, an eject mechanism for disconnecting the loaded PC card from the pin contacts, and the like. The pin housing and the frame may be molded in one piece. The eject mechanism includes a push-rod to be pressed for unloading the PC card, an eject lever pivotally supported and engaged with the push-rod at one end thereof, and the like. The basic structure of the conventional eject mechanism will be described below.

The push-rod is assembled to the side of the frame for guiding the PC card so that it can reciprocally move along the PC card insertion and extraction directions, the eject lever having at one end a protrusion for pushing out the PC card is pivotally mounted at a fixed position on the frame or the pin housing, and the other end of the eject lever is engaged with the rear end of the push-rod, whereby the eject mechanism is constructed. According to this structure, if the push-rod is pressed when the PC card is loaded in the connector, the eject lever is caused to pivot and the protrusion thereof is caused to move forward. Then, one end of the socket contact side end face (hereinafter referred to as pin connecting face) of the PC card is pushed by the protrusion and disconnected from the pin contacts, which allows the PC card to be easily drawn out in the forward direction by the fingers. When the PC card is inserted into the connector for connection to the pin contacts, it pushes in the protrusion and causes the eject lever to pivot in a reverse direction to disconnection, thereby moving the push-rod forward.

In another conventional eject mechanism, a drive lever engaged at one end with the rear end of a push-rod is pivotally mounted at a fixed position on a frame or a pin housing, and the other end of the drive lever is coupled to a slider that has protrusions at both ends and is reciprocally movable along the PC card insertion and extraction directions. This eject mechanism converts the pivot motion of the drive lever into the linear motion of the slider. If the push-rod is pressed when the PC card is loaded in the connector, the two protrusions of the slider push both ends of the pin connecting face of the PC card in the extraction direction.

The former eject mechanism mentioned above pushes one end of the pin contacting face of the PC card by using the protrusion formed on one end of the eject lever that is engaged with the push-rod at the other end. Therefore, the PC card cannot be pushed straight in the extraction direction by the protrusion, that is, it is pushed while being pressed against the push-rod side of the frame. As a result, the unloading operation is not performed smoothly and the PC card itself is apt to be damaged.

On the other hand, the latter eject mechanism mentioned above pushes both ends of the pin contacting face of the PC card by using two protrusions formed on the slider that is drivingly connected to the push-rod via the drive lever. Therefore, the PC card can be pushed almost straight in the extraction direction by the resultant force generated by the two protrusions, and unloading can be performed smoothly. In this case, however, a high-precision guide mechanism capable of ensuring a required clearance is needed in order to linearly move the slider in the PC card insertion and extraction directions, and the slider is required to have high dimensional accuracy and a long slide path, which complicates the structure and hinders size reduction of the mechanism.

SUMMARY OF THE INVENTION

The present invention has been made in view of these problems of the prior arts, and has as an object the provision of a PC card connector with a simple and compact structure that can always smoothly unload a PC card and that is easy to assemble.

According to a main aspect of the present invention, there is provided a PC card connector including a pin housing having a plurality of pin contacts to be connected to socket contacts of a PC card, a push-rod reciprocally supported by a frame integrally formed with the pin housing to be pressed for unloading the PC card, a drive lever pivotally supported by a first support shaft standing on the pin housing and engaged with the push-rod at one end thereof, a first turn arm pivotally supported by the first support shaft, provided at one end with a first protrusion for pushing out the PC card and coupled at the other end to a fixed position of the drive lever, and a second turn arm pivotally supported by a second support shaft standing on the pin housing, provided at one end with a second protrusion for pushing out the PC card, and coupled at the other end to the fixed position of the drive lever, wherein the first support shaft is provided with a fall-preventive section projecting outward from the leading end in the radial direction, wherein the drive lever and the first turn arm are each provided with a hole to be fitted on the first support shaft, and wherein cutouts are formed on the rims of the holes corresponding to the fall-preventive section.

According to this structure, since the protrusions of the first and second turn arms are moved forward by pressing the push-rod, the PC card can be pushed almost straight in the extraction direction by the protrusions. Furthermore, since the first and second turn arms are turned through the pivot of the drive lever, no high-precision guide mechanism is required and size reduction of the mechanism is not hindered. Still furthermore, since the drive lever and the first turn arm are prevented from falling off from the first support shaft by a simple operation of threading the fall-preventive section through the cutouts and then turning the drive lever and the first turn arm, the assembly operation can be easily performed without using any special jig.

Although the drive lever and the first turn arm may be made of metal plates having the same thickness, it is preferable to form sections on the rims of the holes of the drive lever and the first turn arm thinner than other sections and to fit one of the thin sections in the other thin section. In this case, turning sections of the drive lever and the first turn arm about the first support shaft are decreased in thickness, which also reduces the thickness of the mechanism.

Moreover, though the second turn arm does not always have to be of the same shape as the first turn arm, it is preferable that the second support shaft be provided with a fall-preventive section projecting outward from the leading end thereof in the radial direction, the second turn arm be provided with a hole to be fitted on the second support shaft, and a cutout be formed on the rim of the hole corresponding to the fall-preventive section. In this case, the first and second turn arms are given the same shape, and component sharing can be achieved. In addition, since the first and second turn arms are supported by the support shafts having the same shape, the assembly operation can be simplified.

DESCRIPTION OF THE PREFERRED EMBODIMENT

Figure 1:
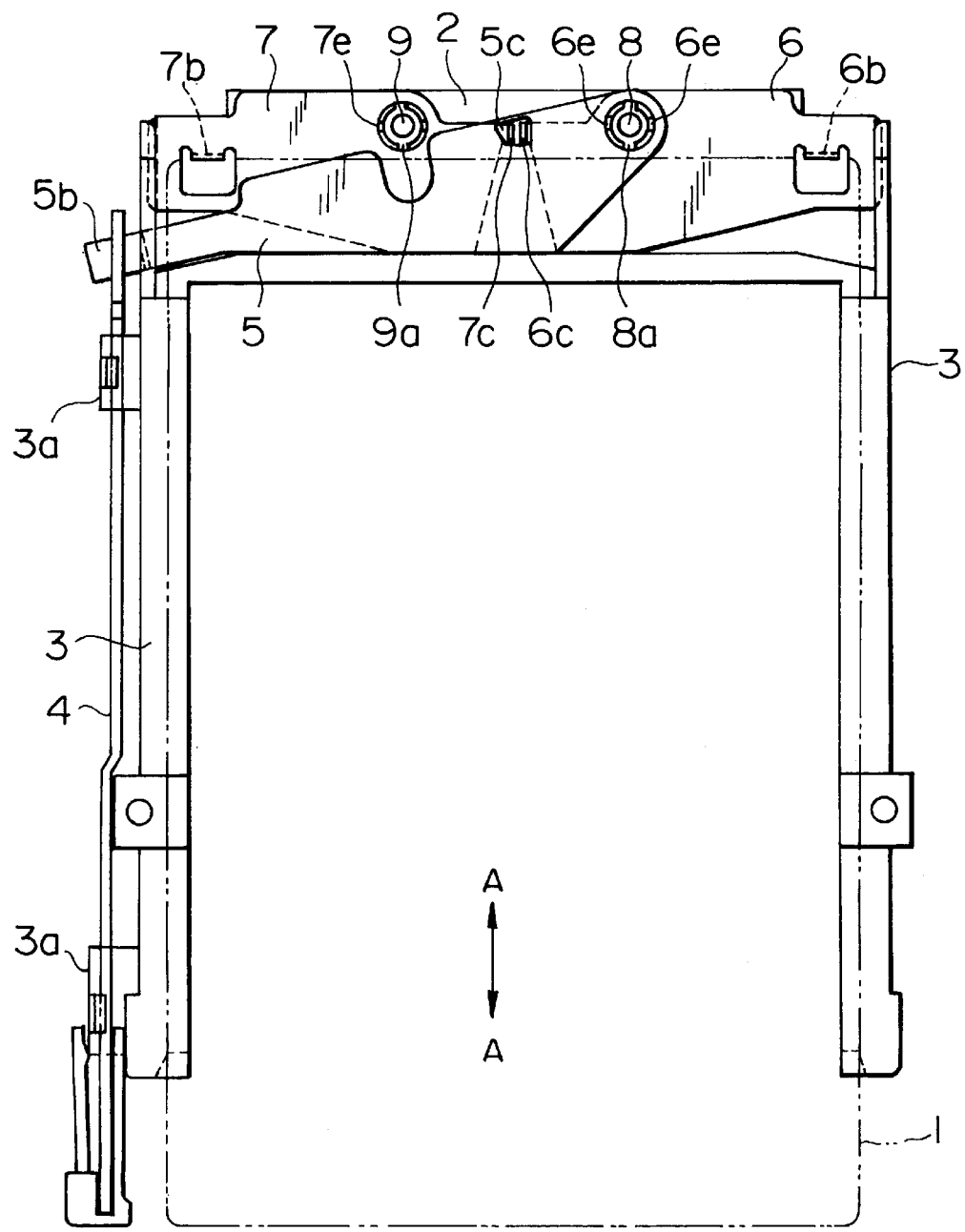
FIG. 1 is a bottom view showing the state in which a PC card is loaded in a PC card connector according to an embodiment of the present invention.
Figure 4:
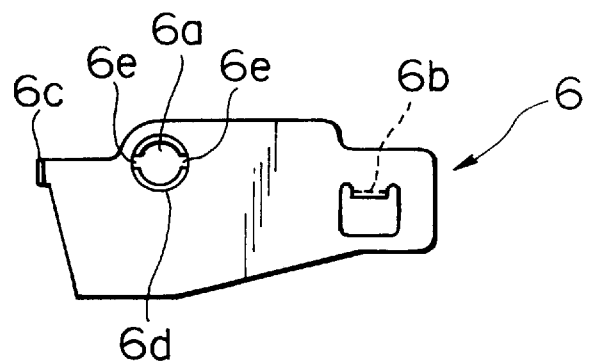
FIG. 4 is a bottom view of a first turn arm provided in the connector.
Figure 5:
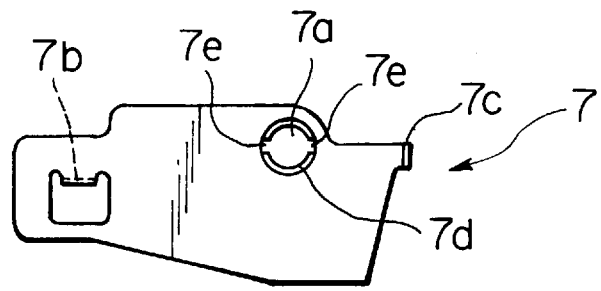
FIG. 5 is a bottom view of a second turn arm provided in the connector.
Figure 6:
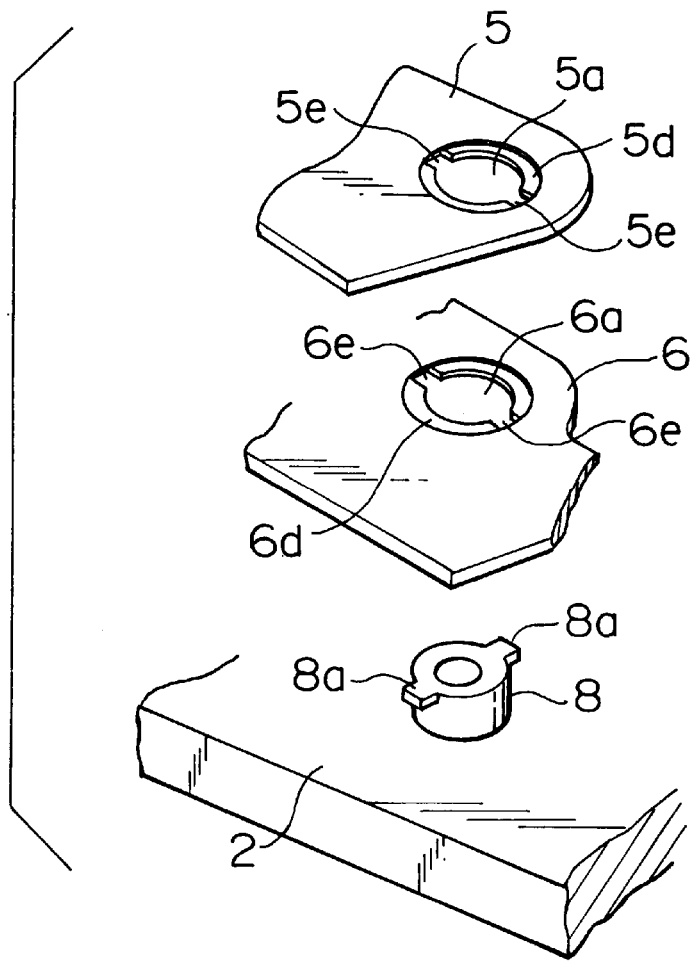
FIG. 6 is an exploded perspective view of a first support shaft, the first turn arm, and the drive lever provided in the connector.
Figure 7:
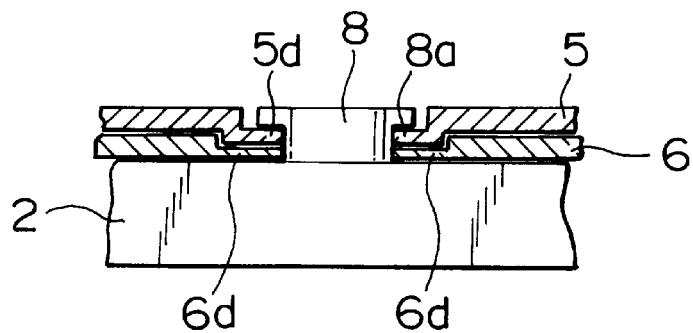
FIG. 7 is a cross-sectional view showing the assembly state of the components shown in FIG. 6.
Figure 8:
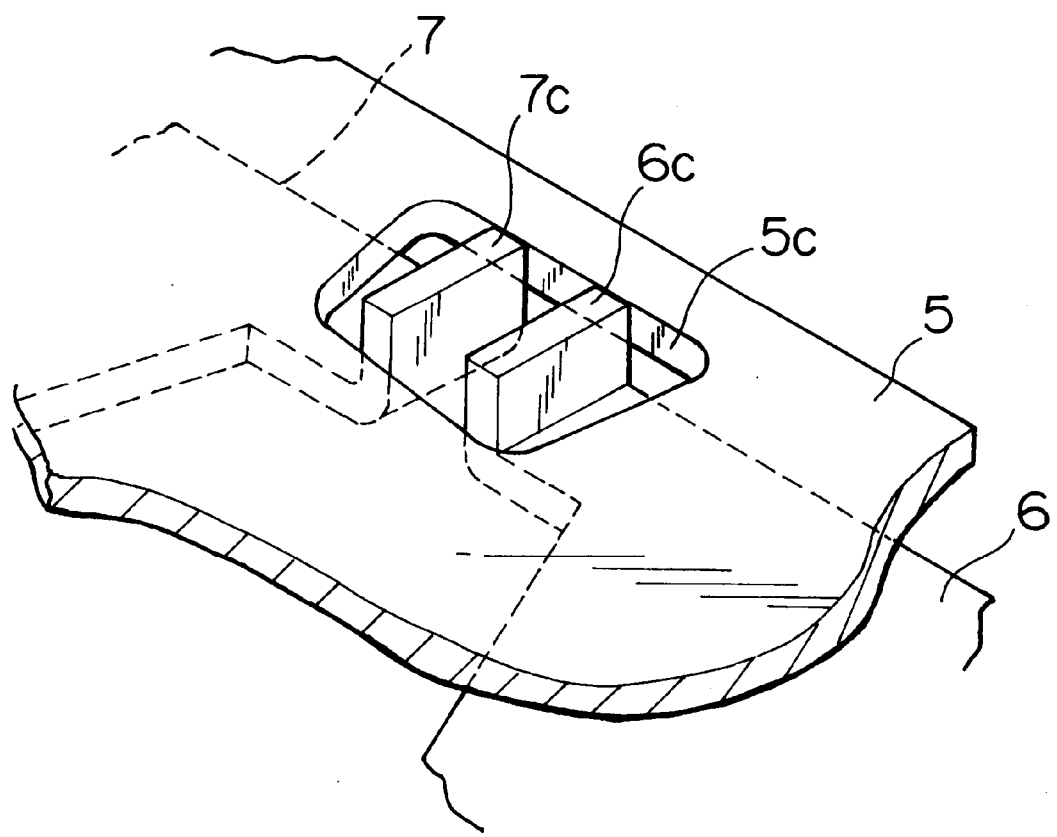
FIG. 8 is a cross-sectional view of a coupling section between the drive lever and the first and second turn arms provided in the connector.

A preferred embodiment of the present invention will now be described with reference to the attached drawings. FIG. 1 is a bottom view showing the state in which a PC card is loaded in a PC card connector according to an embodiment of the present invention, FIG. 2 is a bottom view showing the eject state just after the connector shown in FIG. 1 has disengaged the PC card, FIG. 3 is a bottom view of a drive lever, FIG. 4 is a bottom view of a first turn arm, FIG. 5 is a bottom view of a second turn arm, FIG. 6 is an exploded perspective view of a first support shaft, the first turn arm, and the drive lever, FIG. 7 is a cross-sectional view showing the assembly state of the components shown in FIG. 6, and FIG. 8 is a cross-sectional view of a coupling section between the drive lever and the first and second turn arms.

Figure 2:
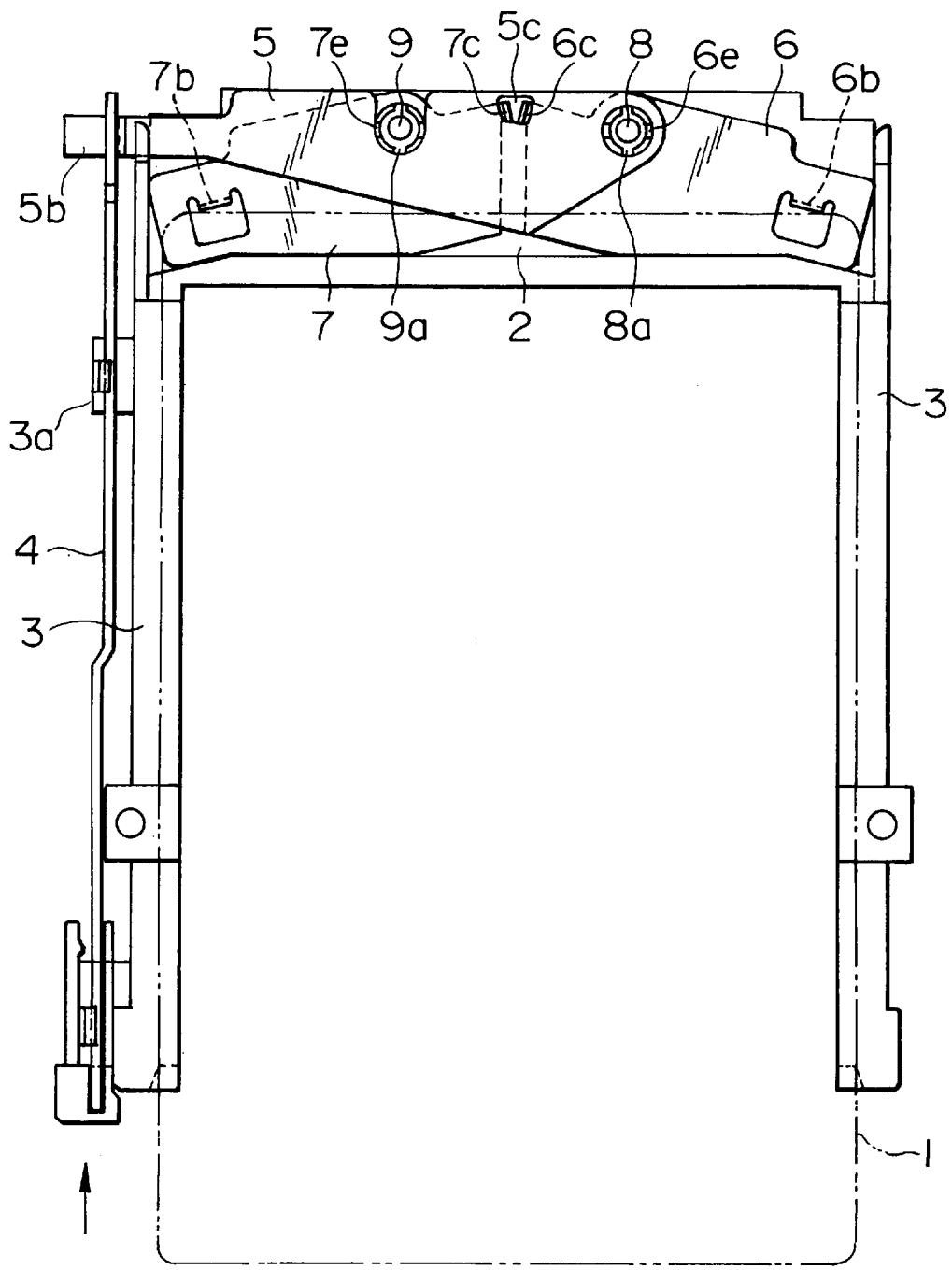
FIG. 2 is a bottom view showing the eject state just after the connector shown in FIG. 1 has disengaged the PC card therefrom.

A PC card connector shown in FIGS. 1 and 2 mainly includes a pin housing 2 in which a plurality of pin contacts to be respectively connected to socket contacts in a PC card 1 are fixedly press-fitted in a required arrangement, a pair of frames 3 fixed on both sides of the pin housing 2 to guide the PC card 1 during insertion and extraction, a push-rod 4 attached to one of the frames 3, a drive lever 5 to be driven by the push-rod 4, and first and second turn arms 6 and 7. The drive lever 5 and the first and second turn arms 6 and 7 are each made of a stamped metal plate.

The structure of an eject mechanism in such a connector will next be described in detail. The push-rod 4 to be pressed for extracting the PC card 1 is held by two support frames 3a projecting from the side of the frame 3 for reciprocal movement along the PC card insertion and extraction directions (the directions of arrow A in FIG. 1). On the other hand, the drive lever 5 and the first turn arm 6 are pivotally supported by a first support shaft 8 standing on the pin housing 2, and the second turn arm 7 is pivotally supported by a second support shaft 9 similarly standing on the pin housing 2.

Figure 3:
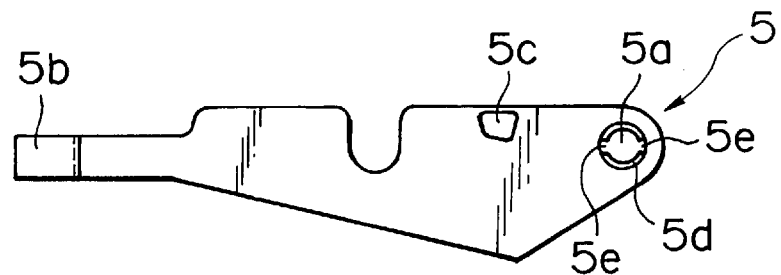
FIG. 3 is a bottom view of a drive lever provided in the connector.

The drive lever 5 is, as shown in FIG. 3, provided with a circular hole 5a to be fitted on the first support shaft 8 serving as a turn shaft therefor, an engaging section 5b projecting at the opposite end to the circular hole 5a, and a coupling hole 5c interposed between the circular hole 5a and the engaging section 5b. The engaging section 5b is engaged with the leading end of the push-rod 4. Moreover, a concave section 5d, that is thinner than other sections, is formed around the circular hole 5a, and a pair of cutouts 5e are formed at opposed positions on the rim of the circular hole 5a so that they cross the concave section 5d.

The first turn arm 6 is, as shown in FIG. 4, provided with a circular hole 6a to be fitted on the first support shaft 8 serving as a turn shaft therefor, a protrusion 6b for pushing out the PC card 1, and a tongue 6c projecting in the coupling hole 5c of the drive lever 5. The protrusion 6b and the tongue 6c are bent in opposite directions at about right angles to the plane of the first turn arm 6. Moreover, a concave section 6d, that is thinner than other sections, is formed around the circular hole 6a, and a pair of cutouts 6e are formed at opposed positions on the rim of the circular hole 6a so that they cross the concave section 6d.

The second turn arm 7 is obtained by turning the first turn arm 6 one-half turn, that is, these turn arms 6 and 7 have the same shape. As shown in FIG. 5, the second turn arm 7 is provided with a circular hole 7a to be fitted on the second support shaft 9 serving as a turn shaft therefor, a protrusion 7b for pushing out the PC card 1, and a tongue 7c projecting in the coupling hole 5c of the drive lever 5. The protrusion 7b and the tongue 7c are bent in opposite directions at about right angles to the plane of the second turn arm 7. Moreover, a concave section 7d, that is thinner than other sections, is formed around the circular hole 7a, and a pair of cutouts 7e are formed at opposed positions on the rim of the circular hole 7a so that they cross the concave section 7d.

The first support shaft 8 is, as shown in FIG. 6, provided with a pair of fall-preventive sections 8a, that project outward in the radial direction, at opposed positions of the leading end thereof. Similarly, the second support shaft 9 is provided with a pair of fall-preventive sections 9a projecting outward in the radial direction at opposed positions of the leading end thereof. As mentioned above, the circular hole 6a of the first turn arm 6 and the circular hole 5a of the drive lever 5 are held by the first support shaft 8 so that the first turn arm 6 and the drive lever 5 are pivotally movable, and the circular hole 7a of the second turn arm 7 is held by the second support shaft 9 so that the second turn arm 7 is pivotally movable. The procedure for assembling these components will be described below.

First, the fall-preventive sections 8a are threaded through the cutouts 6e of the first turn arm 6 so that the circular hole 6a is fitted on the first support shaft 8, and then the first turn arm 6 is caused to pivot through about 90°. Similarly, the fall-preventive sections 9a are threaded through the cutouts 7e of the second turn arm 7 so that the circular hole 7a is fitted on the second support shaft 9, and then the second turn arm 7 is caused to pivot through about 90°. Next, the fall-preventive sections 8a are threaded through the cutouts 5e of the drive lever 5 so that the circular hole 5a is fitted on the first support shaft 8, the drive lever 5 is caused to pivot through about 90°, and then the engaging section 5b is engaged with the leading end of the push-rod 4. Moreover, the tongues 6c and 7c of the first and second turn arms 6 and 7 are engaged with the coupling hole 5c of the drive lever 5, as shown in FIG. 8. As a result, since the rim of the circular hole 5a of the drive lever 5 laid on the first turn arm 6 is, as shown in FIG. 7, opposed to the fall-preventive sections 8a, the drive lever 5 and the first turn arm 6 are prevented from falling off from the first support shaft 8, and the concave section 5d of the drive lever 5 is fitted in the concave section 6d of the first turn arm 6. Since the concave sections 5d and 6d are formed thinner than other sections, the total length of the first support shaft 8 including the fall-preventive sections 8a can be limited to a value equivalent to the sum of thicknesses of the drive lever 5 and the first turn arm 6.

In the connector having the above structure, when the PC card 1 is inserted from card inserting sections of the frames 3 toward the pin housing 2, it press-fits the pin contacts of the pin housing 2 into the socket contacts therein while pushing the protrusions 6b and 7b of the first and second turn arms 6 and 7. Therefore, when the PC card 1 is inserted by a required amount, it is in reliable contact with the pin contacts and the loading thereof is completed, as shown in FIG. 1. At this time, the first and second turn arms 6 and 7 are respectively caused to pivot about the first and second turn shafts 8 and 9 in opposite directions, and the pivots thereof are respectively transmitted to the drive lever 5 via the coupling sections between the tongues 6c and 7c and the coupling hole 5c. Consequently, the drive lever 5 is caused to pivot about the first support shaft 8, and the push-rod 4 is thereby moved toward the front side of the frame 3.

If the push-rod 4 is pressed while the PC card 1 is thus loaded in the connector, the first and second turn arms 6 and 7 are caused to pivot in opposite directions in correlation with the turn of the drive lever 5, and brought into the state shown in FIG. 2. As a result, the tongues 6b and 7b of the turn arms 6 and 7 push both front ends of the PC card 1. In other words, the PC card 1 can be pushed almost straight in the extraction direction, and the extracting operation is always performed smoothly. Moreover, since the eject mechanism of this embodiment turns the first and second turn arms 6 and 7 through the turn of the drive lever 5, the size thereof can be reduced and the dimensional accuracy to be required is not so high, compared with the conventional eject mechanism that converts the turn into a linear motion, and there is no need to add a special guide mechanism. This provides an eject mechanism that can always smoothly eject a PC card without a large and complicated structure. Furthermore, since the fall-preventive sections 8a are formed at the leading end of the first support shaft 8 and the cutouts 5e and 6e are respectively formed on the drive lever 5 and the first turn arm 6 corresponding to the fall-preventive sections 8a, a complicated fall-preventive means, such as caulking, is unnecessary, and the falling can be prevented by a simple operation of fitting on the first support shaft 8 and turning the drive lever 5 and the first turn arm 6, which simplifies the assembly operation. Still furthermore, since the concave sections 5d and 6d, which are thinner than other sections, are respectively formed on the rims of the circular holes 5a and 6a of the drive lever 5 and the first turn arm 6 and one of the concave sections 5d is fitted in the other concave section 6d, it is possible to limit the total length of the first support shaft 8 including the fall-preventive sections 8a to a value equivalent to the sum of thicknesses of the drive lever 5 and the first turn arm 6, and to thereby reduce the thickness of the entire mechanism.

In the above embodiment, the first and second turn arms 6 and 7 have the same shape and the second turn arm 7 is supported by the second support shaft 9 having the fall-preventive sections 9a, which provides commonality of components and achieves cost reduction. Since the second turn arm 7 is also prevented by the drive lever 5, which pivots thereon, from falling off from the second support shaft 9, the second support shaft 9 may be shaped like a normal cylinder. Furthermore, since the second support shaft 9 supports only the second turn arm 7, the size thereof can be made equivalent to or less than that of the first support shaft 8 without providing the second turn arm 7 with the thin concave section 7d.

While the preferred embodiment of the present invention has been described above, the present invention is by no means limited to the embodiment, and various modifications and arrangements may be made without departing from the scope of the following claims.

What is claimed is:

1. A PC card connector comprising:

a pin housing having a plurality of pin contacts to be connected to socket contacts of a PC card;

a push-rod reciprocally supported by a frame integrally formed with said pin housing to be pressed for unloading the PC card;

a drive lever pivotally supported by a first support shaft standing on said pin housing, and engaged with said push-rod at one end thereof;

a first turn arm pivotally supported by said first support shaft, provided at one end with a first protrusion for pushing out the PC card, and coupled at the other end to a fixed position on said drive lever; and a second turn arm pivotally supported by a second support shaft standing on said pin housing, provided at one end with a second protrusion for pushing out the PC card, and coupled at the other end to the fixed position on said drive lever, wherein said first support shaft is provided with a fall-preventive section projecting outward from the leading end in the radial direction, wherein said drive lever and said first turn arm are each provided with a hole to be fitted on said first support shaft, wherein cutouts are formed on the rims of said holes corresponding to said fall-preventive section, wherein sections on the rims of said holes of said drive lever and said first turn arm are formed thinner than other sections, and one of said thin sections is fitted in the other thin section, and wherein the sum of thicknesses of said drive lever and said first turn arm is approximately equal to the length of said first support shaft, and said fall-preventive section is engaged with said one of said thin sections while said drive lever and said first turn arm are fitted on said first support shaft so as to be prevented from falling off.

2. A PC card connector according to claim 1, wherein said second support shaft is provided with a fall-preventive section projecting outward from the leading end in the radial direction, said second turn arm is provided with a hole to be fitted on said second support shaft, and a cutout is formed on the rim of said hole corresponding to said fall-preventive section.

* * * * *